United States Patent
Morley et al.

(10) Patent No.: US 8,095,961 B1
(45) Date of Patent: Jan. 10, 2012

(54) SYSTEMS AND METHODS FOR QUARANTINING A NODE FROM OTHER NODES IN A NETWORK

(75) Inventors: David B. Morley, Highland, UT (US); Monte Sharp, South Jordan, UT (US); Alan B. Butt, Orem, UT (US)

(73) Assignee: Crimson Corporation, Dover, DE (US)

( * ) Notice: Subject to any disclaimer, the term of this patent is extended or adjusted under 35 U.S.C. 154(b) by 871 days.

(21) Appl. No.: 11/828,846

(22) Filed: Jul. 26, 2007

(51) Int. Cl.
*G06F 17/00* (2006.01)
*G06F 17/30* (2006.01)

(52) U.S. Cl. .................... 726/1; 726/3; 726/4

(58) Field of Classification Search ............... 726/1, 3, 726/4
See application file for complete search history.

(56) References Cited

U.S. PATENT DOCUMENTS

| | | | |
|---|---|---|---|
| 5,689,566 | A | 11/1997 | Nguyen |
| 5,805,501 | A | 9/1998 | Shiau et al. |
| 6,871,284 | B2 | 3/2005 | Cooper et al. |
| 7,188,180 | B2 | 3/2007 | Larson et al. |
| 7,263,609 | B1 | 8/2007 | Wante et al. |
| 7,325,140 | B2 | 1/2008 | Carley |

OTHER PUBLICATIONS

Kondo (http://tools.ietf.org/id/draft-kondo-quarantine-overview-02.txt Mar. 8, 2006).*
Chorzempa (Key Management for Wireless Sensor Networks in Hostile Environments Michael W. Chorzempa Apr. 28, 2006).*
An Effective SIP Security Solution for Heterogeneous Mobile Networks; Liang Zhang; Miyajima, H.; Hayashi, H.; Communications, 2009. ICC '09. IEEE International Conference on; Publication Year: 2009 , pp. 1-5.*
A power efficient link-layer security protocol (LLSP) for wireless sensor networks; Jian Ren; Tongtong Li; Aslam, D.; Military Communications Conference, 2005. MILCOM 2005. IEEE; Publication Year: 2005 , pp. 1002-1007 vol. 2.*
Study on Kerberos protocol based on fuzzy control ; Yang Jian; Computing, Communication, Control, and Management, 2009. CCCM 2009. ISECS International Colloquium on vol. 1 ; Publication Year: 2009 , pp. 290-292.*

* cited by examiner

*Primary Examiner* — David Y Jung (74) *Attorney, Agent, or Firm* — Austin Rapp & Hardman (57) ABSTRACT

A method for quarantining a node from other nodes in a network is described. A node is scanned to obtain a health posture of the node by determining if the node is compliant with one or more requirements. A current policy in accordance with the obtained health posture of the node is obtained. A previous policy is removed. If the node is determined to be non-compliant, a key that is unique to the non-compliant node is selected. The current policy is applied.

18 Claims, 8 Drawing Sheets

SYSTEMS AND METHODS FOR QUARANTINING A NODE FROM OTHER NODES IN A NETWORK

TECHNICAL FIELD

The present invention relates generally to computers and computer-related technology. More specifically, the present invention relates to systems and methods for quarantining a node from other nodes in a network.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. These computers are often interconnected to form a computer network. As is often the case, a single server or core server is responsible for managing other computers. The managed computers are often referred to as nodes. A computer network may have hundreds or even thousands of managed nodes.

Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly, computer software is also frequently upgraded or replaced. New computer hardware and software is continually being integrated into systems across the world.

As corporate performance and end-user productivity have become increasingly dependent on computers, computer support personnel are continuously under pressure to accomplish more with existing or reduced staff head counts. They are also under pressure to perform tasks as efficiently as possible which may include minimizing effects to existing computer systems and networks.

There is a need for systems and methods that will improve the ability to manage and support computer systems by quarantining unhealthy computer systems from communicating with healthy computer systems. Improved systems and methods may enable communications over a network to be secure and uncorrupted. Benefits may be realized by providing increased functionality to allow or deny communications from computer systems within a network by quarantining unhealthy computer systems from healthy computer systems.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

A method for quarantining a node from other nodes in a network is described. The node is scanned to obtain a health posture of the node by determining if the node is compliant with one or more requirements. A current policy in accordance with the obtained health posture of the node is obtained. A previous policy is removed. If the node is determined to be non-compliant, a key that is unique to the non-compliant node is selected. The current policy is applied.

The current policy may be an unhealthy Internet Protocol Security (IPSec) policy. The current policy may comprise authentication information. In one embodiment, the authentication information comprises a pre-shared key based authentication. The unique key may be selected at random. The unique key may be a value unique to the node. The unique key may be the unique identification of the node.

In one embodiment, certificates and private keys are removed from a protocol stack within the node. Communications may be denied with other nodes within a network that do not include the selected unique key. Communications may be allowed with other nodes that are included within an exclusion list within the current policy. A second current policy that is different from the current policy may be applied if the node is determined to be compliant. Communications may be allowed with other nodes within a network that include the second current policy. Communications may be allowed with other nodes that are included within an exclusion list within the second current policy.

A computer system that is configured to be quarantined from other computer systems in a network is also described. The computer system comprises a processor and memory in electronic communication with the processor. Instructions are stored in the memory. The computer system is scanned to obtain a health posture of the node by determining if the node is compliant with one or more requirements. A current policy in accordance with the obtained health posture of the computer system is obtained. A previous policy is removed. If the computer system is determined to be non-compliant, a key that is unique to the non-compliant computer system is selected. The current policy is applied.

A computer-readable medium comprising executable instructions for quarantining a node from other nodes in a network is also described. The node is scanned to obtain a health posture of the node by determining if the node is compliant with one or more requirements. A current policy in accordance with the obtained health posture of the node is obtained. A previous policy is removed. If the node is determined to be non-compliant, a key that is unique to the non-compliant node is selected. The current policy is applied.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Internet Protocol Security (IPSec) is an extension to the Internet Protocols (IP) that performs various security operations with other computers at the networking level. IPSec may authenticate a remote computer, insure that communications between computers are private and insure that communications are not altered in transit. These operations may be performed on a computer by computer basis. The IPSec mechanisms may be used by network quarantine technology to allow or deny communications with other computers.

Communications may be allowed or denied based upon a health posture (a statement of health). A computer may be healthy if it meets certain requirements that are determined by a user. Examples of these certain requirements may include having virus protection installed, active and current pattern files, intrusion detection and prevention mechanisms installed and active, designated operating system patches installed, firewall settings applied, application patches applied, verification that certain software is not present, etc. Scanning software may be used to ascertain the health status of a computer and remediation software may be used to remediate any problems. However, the scanning software may not prevent an unhealthy computer from accessing a network. Likewise, computers (and other devices like network printers) that do not have scanning software installed may also be able to access the network. The present systems and methods provide the scanning software the ability to quarantine unhealthy computers and deny access to computers that have not performed scans to determine the health posture.

Figure 1:
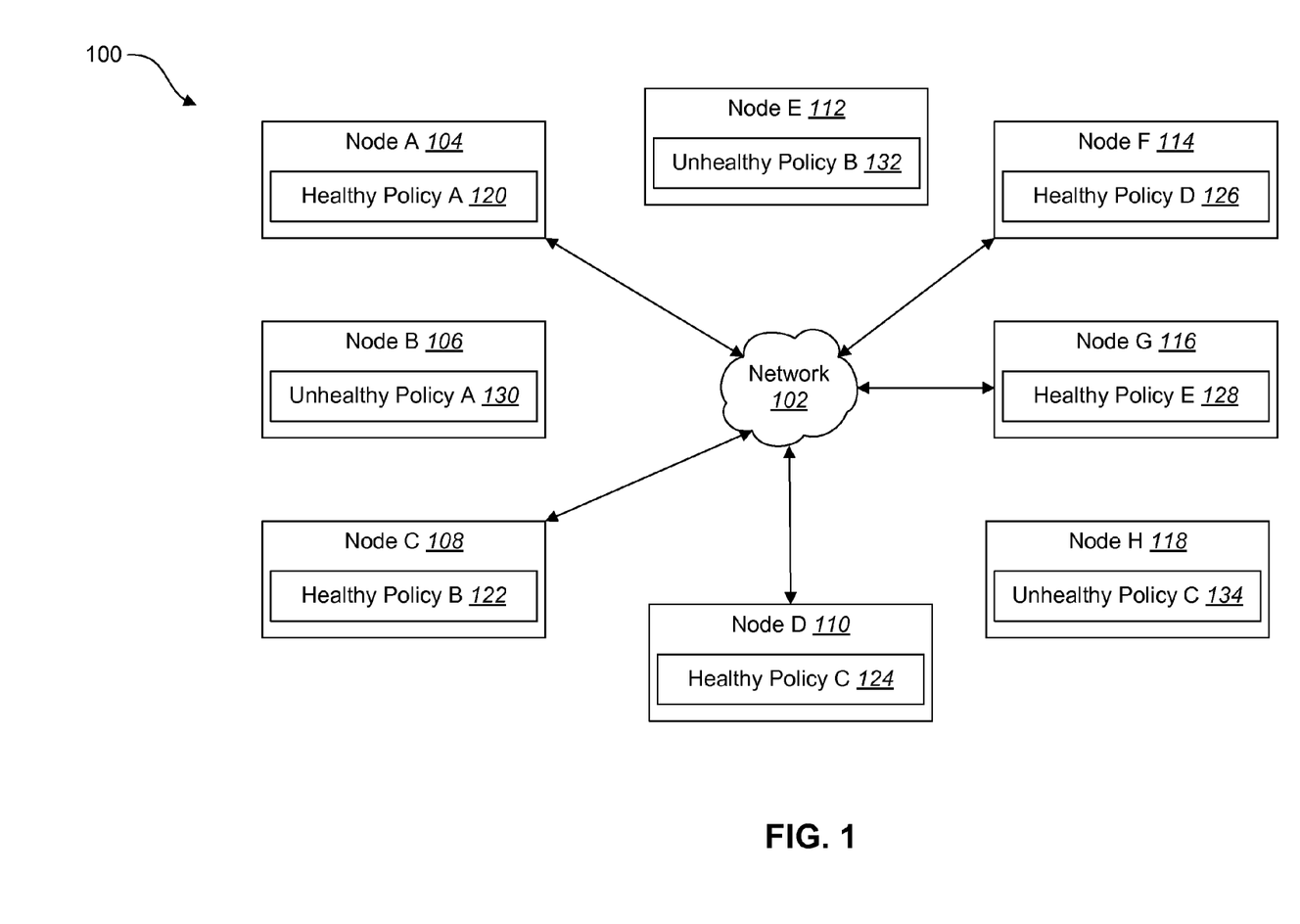
FIG. 1 is a block diagram illustrating one embodiment of a plurality of nodes in a network.

FIG. 1 is a block diagram 100 illustrating one embodiment of a plurality of nodes in a network 102. A node may be any type of device that communicates with IP protocols, such as, but not limited to, a computer, printer, mobile station (cell phone), refrigerator, automobile, Personal Digital Assistant (PDA). Each of the plurality of nodes may include a policy that indicates the health posture of the node. For example, it may be determined that node A 104, node C 108, node D 110, node F 114 and node G 116 are healthy nodes. As such, node A 104 may include healthy policy A 120, node C 108 may include healthy policy B 122, node D 110 may include healthy policy C 124, node F 114 may include healthy policy D 126 and node G 116 may include healthy policy E 128. In contrast, it may be determined that node B 106, node E 112 and node H 118 are unhealthy nodes. As such, node B 106 may include unhealthy policy A 130, node E 112 may include unhealthy policy B 132 and node H 118 may include unhealthy policy C 134.

Nodes that are determined to be healthy and include a healthy policy may be allowed to communicate with each other over the network 102. However, nodes that are deemed to be unhealthy and include an unhealthy policy are quarantined from all other nodes in the network 102. For example, node A 104 may communicate with node D 110 over the network 102, but node B 106 is quarantined from node A 104 and node D 110. In addition, node B 106 is quarantined from unhealthy node E 112 and unhealthy node H 118. In other words, node B 106, node E 112 and node H 118 are denied the ability to communicate with any of the other nodes in the network 102.

Figure 2:
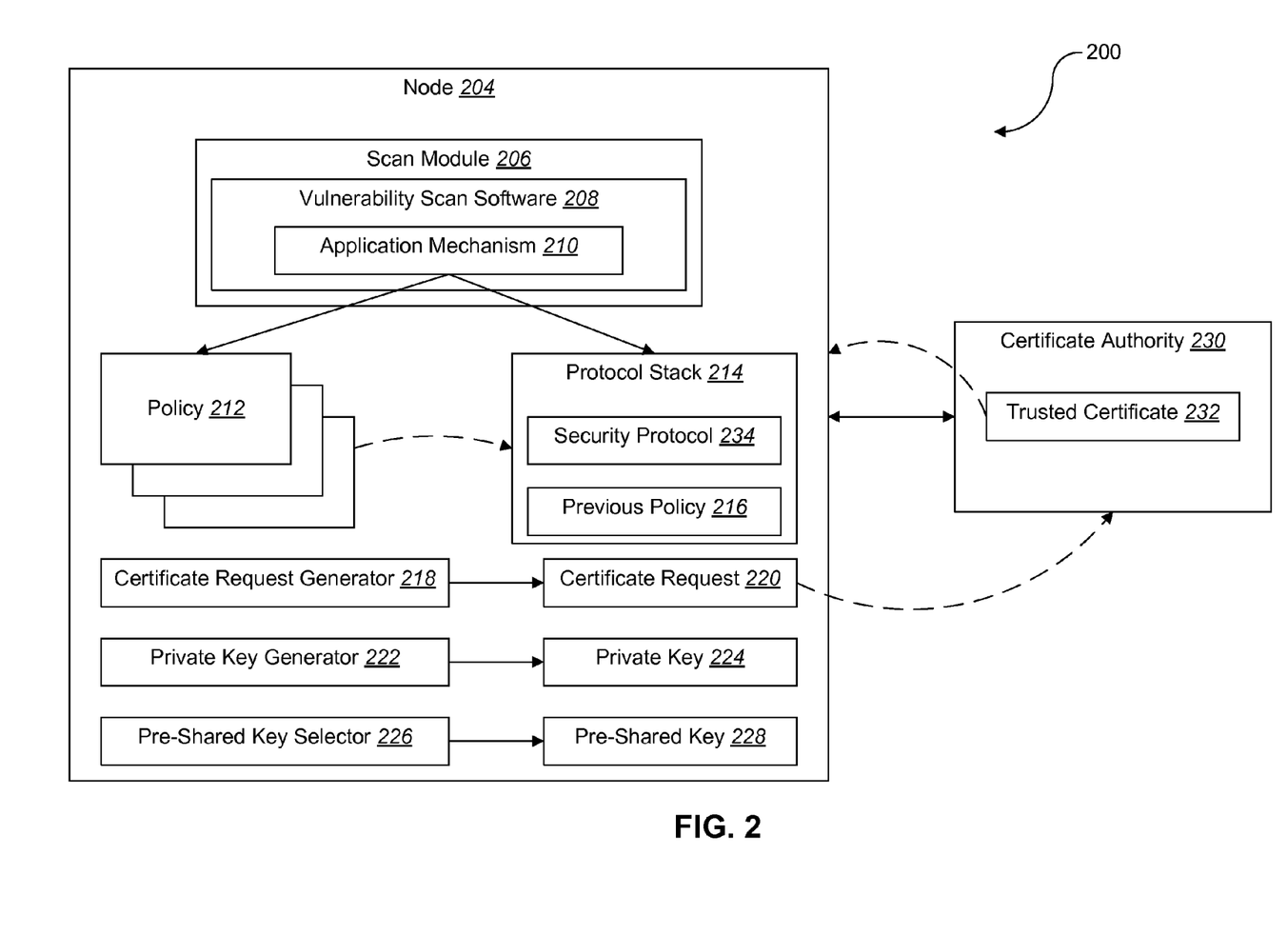
FIG. 2 is a block diagram of a node with a scan module that scans the node to determine a health posture.

FIG. 2 is a block diagram 200 of a node 204 with a scan module 206 that scans the node 204 to determine a health posture. The scan module 206 may include vulnerability scan software 208 that scans the node 204. In one embodiment, when a node is placed in a network that requires communication with other nodes in the same network, the vulnerability scan software 208 may be installed. The software 208 may be installed directly at the node 204 or the software 208 may be installed though an installation console. The software 208 may execute a vulnerability scan periodically and/or after certain system events such as install, reboot or network changes occur. In one embodiment, network changes occur when a node moves from one subnet to another subnet within the network 102. Network changes may also occur when the node 204 moves out of the network 102 and then moves back into the network 102.

The software 208 may include an application mechanism 210 that applies one of a plurality of policies 212 to the node 204 based on the health posture. In one embodiment, the policy 212 may be a healthy policy or an unhealthy policy. The application mechanism 210 may also communicate with a protocol stack 214. The protocol stack 214 may be an IP protocol stack and may include a previous policy 216 that had been applied to the node 204. The application mechanism 210 may apply the policy 212 to the protocol stack 214 and the policy 212 may replace the previous policy 216.

The stack 214 may also include a security protocol 234. In one embodiment, the security protocol 234 is IPSec. The security protocol 234 may be provided by the vendors of the operating system of the node 204 or as an add-on to the operating system. The security protocol 234 may act according to the policies 212, 216 determined by an administrator of the node 204. The policies 212, 216 may include authentication information, tokens, exclusion lists, encryption and packet validation algorithm identification, timeouts, etc.

The security protocol 234 may work with Transmission Control Protocol (TCP) and User Datagram Protocol (UDP) based protocols. Broadcast and multicast packets may be automatically excluded from communications handled by the security protocol 234 as these types of packets are not point-to-point. The security protocol 234 (such as IPSec) is an extension to IP-v4, but is built into IP-v6.

The node 204 includes a certificate request generator 218 that generates a certificate request 220. The request 220 may be transmitted to a certificate authority 230. The authority 230 may be separate from the node 204. The certificate authority 230 may evaluate the request 220 and transmit a trusted certificate 232 to the node 204. The node 204 further includes a private key generator 222 which may generate a private key 224 that may be used when the node 204 communicates with other nodes. The node 204 also includes a pre-shared key selector 226 that selects a pre-shared key 228. The pre-shared key 228 may be a unique identification for the node 204 that enables the node 204 to be quarantined from communicating with any other nodes on the network 102.

Figure 3:
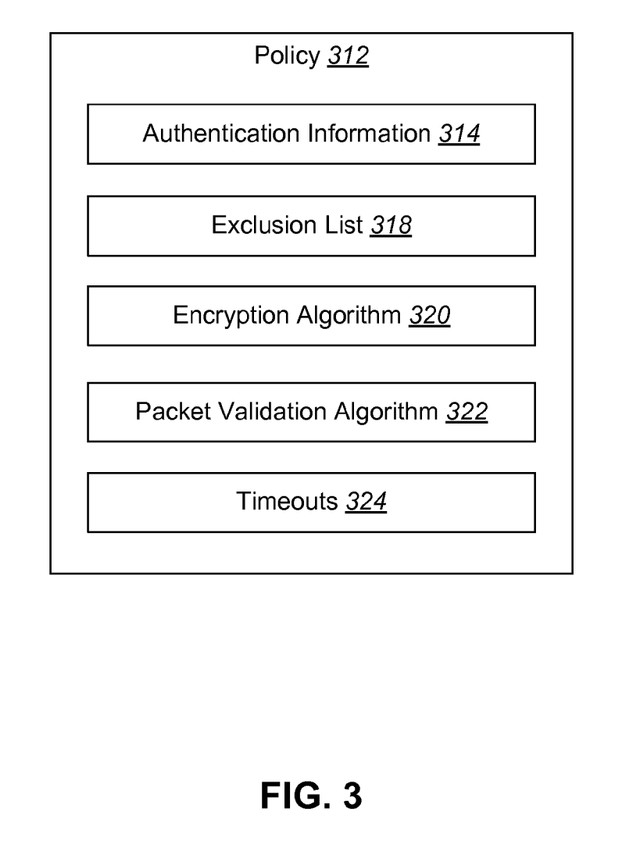
FIG. 3 illustrates one embodiment of a policy that may be implemented in the protocol stack of the node.

FIG. 3 illustrates one embodiment of a policy 312 that may be implemented in the protocol stack 214 of the node 204. The policy 312 may be a healthy policy or an unhealthy policy. As previously explained, a healthy policy is applied to a node that is deemed to be healthy from the scan software 208 while an unhealthy policy is applied to the node if it is determined that the node is unhealthy.

The policy 312 may include authentication information 314 which may be certificate based, domain based or pre-shared key based. The policy 312 may also include an exclusion list 318 that lists the IP addresses of nodes, or ranges of IP addresses, that are excluded from the security protocol 234.

Encryption algorithms 320 may be used to ensure that the data transmitted over the network 102 remains private during the transmission. The security protocol 234 insures that shared key exchanges also occur in a manner that cannot be intercepted or altered by a third party. The policy 312 specifies which encryption algorithms 320 and key exchange algorithms are used.

Packet validation algorithms 322 may be used to verify that data sent through a protocol is unaltered during transmission. A hash value may be calculated on packet data, including the headers of the packet. On receipt of the packet, the hash value is recalculated and compared. If the comparison fails, the packet is discarded. The policy 312 may specify which packet validation algorithms 322 to use. Other values, such as timeouts 324 between authentication and key renewal, sub protocols to be ignored (such as Domain Name System (DNS), Dynamic Host Configuration Protocol (DHCP), Windows Internet Name Service (WINS), administrator chosen protocols, etc.) may also be specified within the policy 312.

Figure 4:
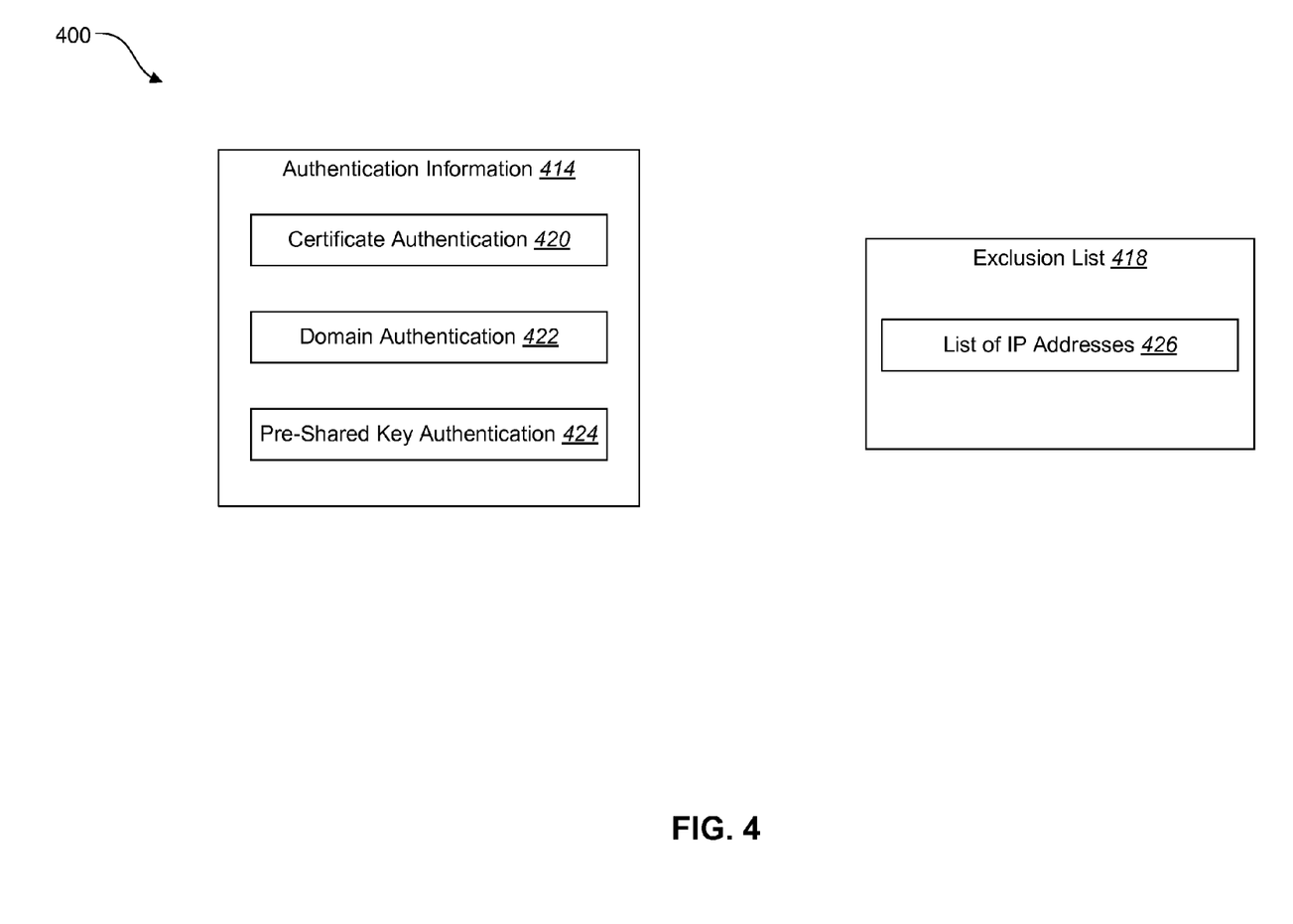
FIG. 4 is a block diagram illustrating one embodiment of authentication information and an exclusion list.

FIG. 4 is a block diagram 400 illustrating one embodiment of authentication information 414 and an exclusion list 418. As previously mentioned, authentication information 414 includes certificate authentication 420, domain authentication 422 and pre-shared key authentication 424. Certificate based authentication 420 may incorporate the trusted certificate 212. Nodes that have a client identification certificate signed by the trusted certificate 212 may be allowed to communicate with other nodes on the network 102. All other nodes that do not have a client identification certificate signed by the trusted certificate 212 may be denied communication with all other nodes on the network 102. Domain based authentication 422 may include the node 204 being domain authenticated. Nodes that are not domain authenticated may be denied from communicating with other nodes on the network 102. Pre-shared key based authentication 424 requires that nodes that communicate with each other have the same key (a shared secret, for example a pass-phrase or password).

The exclusion list 418 may include a list 426 of the IP addresses of nodes, or ranges of IP addresses, that are excluded from the security protocol 234. In other words, if a nodes' IP address is excluded, the security protocol 234 is not used during communication with that node regardless of any health posture or other considerations.

Figure 5:
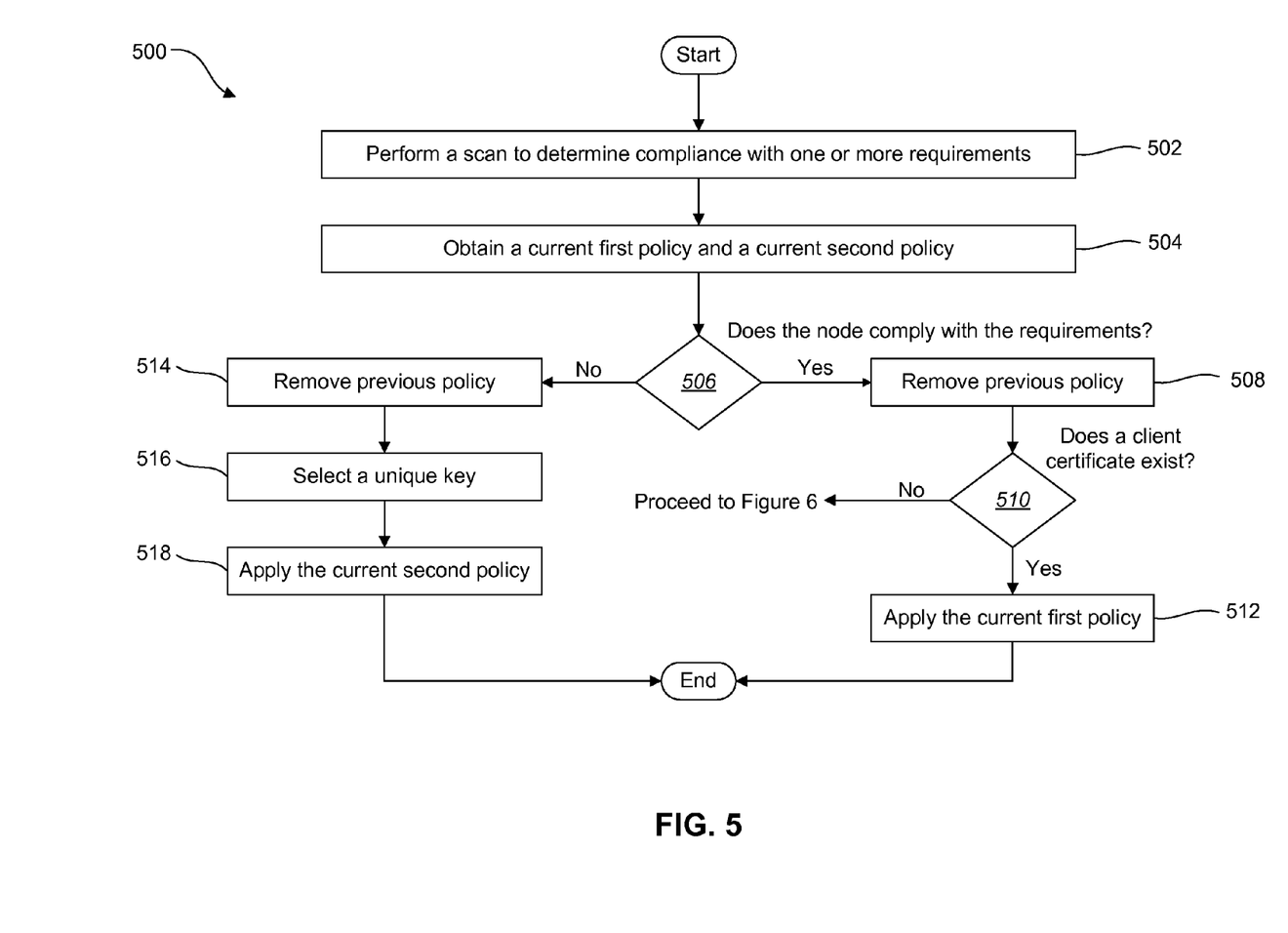
FIG. 5 is a flow diagram illustrating a method for applying a policy to a node depending on the health posture of the node.

FIG. 5 is a flow diagram illustrating a method 500 for applying a policy to a node 204 depending on the health posture of the node 204. In one embodiment, the method 500 may be implemented by the node 204. A scan may be performed 502 to determine if the node 204 is compliant with one or more requirements as previously mentioned. The scan may be performed 502 by the vulnerability scan software 208. A current first policy and a current second policy may be obtained 504. The current first policy may be a healthy IPSec policy and the second policy may be an unhealthy IPSec policy.

A determination 506 is made whether the node 204 complies with the one or more requirements. If the scan determines that the node 204 does comply, any previous policy on the node 204 is removed 508. A determination 510 is made whether a client certificate exists. If the client certificate does exist, the current first policy is applied 512 to the node 204. However, if the client certificate does not exist, the method 500 continues to the steps illustrated in FIG. 6, which will be discussed below.

As previously mentioned, the current first policy may be a healthy IPSec policy that allows the node 204 to communicate with other nodes that are also healthy. The healthy IPSec policy may also include nodes that excluded (IP addresses to which communication is allowed without authentication). For example, network printers and other network devices may not support the security protocol 234 (such as IPSec), but communication to these devices must be supported. The security protocol 234 may require a certain amount of central processing unit (CPU) and network resources. On high volume servers, it may not be desirable to use security protocols 234 such as IPSec. These nodes may also be included in the exclusion list 318. In networks where Internet communication does not go through a proxy, the public Internet addresses may be excluded because public web servers typically do not support security protocols 234 such as IPSec, so any IPSec key negotiation with those nodes may fail.

If it is determined 506 that the node 204 does not comply with the one or more requirements, any previous policies are removed 514 and a unique key is selected 516. The current second policy may be applied 518 to the node 204. The current second policy may be an unhealthy IPSec policy. The current second policy (or unhealthy IPSec policy) is applied 518 when the vulnerability scan detects non-compliance with administrator selected requirements. The purpose of the current second policy is to prevent communication with all other nodes or devices except for those specifically excluded. Exclusions may be allowed to remediate the node in order to bring the node back into compliance. The non-compliant node may need to download patches, virus pattern files, etc. in order to restore the nodes' health. In addition, the network administrator may allow unhealthy nodes to communicate with the Internet or local network services.

As previously mentioned, the application mechanism 210 removes 508, 514 any previous policy. Removing 508, 514 any previous policy includes removing any certificates/keys from the protocol stack 214. When an unhealthy IPSec policy is applied 518, access to all other nodes not specifically excluded is denied using the pre-shared key authentication mechanism 424. In one embodiment, the pre-shared key used is selected to be unique to the node. If the node attempts to communicate with another node that is not enabled with the security protocol 234, communication is denied because the other node will not respond to the security protocol 234 negotiation. If the other node is configured for the security protocol 234 with an authentication algorithm other than the pre-shared key (for example certificate based or domain based) communication is denied. If the other node is configured with the security protocol 234 using pre-shared key, communication is denied, because the pre-shared keys do not match. The application of an unhealthy IPSec policy effectively quarantines the node from all other nodes not in the exclusion list 318.

In one embodiment, the certificates and keys are not removed from the node when previous policies are removed 508, 514. Instead, they are kept on the node in a location where the protocol stack 214 will not use them. If the certificate were actually removed, the node would be required to obtain a new certificate when it becomes healthy. Obtaining a certificate may be a difficult and burdensome process, especially if a username/password needs to be entered or an administrator is required to approve the certificate. When the node becomes healthy again, if the certificate and private key are still available, they may be used without obtaining a new certificate. The application mechanism 210 may check is the save certificate/key has been repudiated or if they have expired. If acceptable, the saved certificate/key may be used. Otherwise, a new certificate is obtained.

Figure 6:
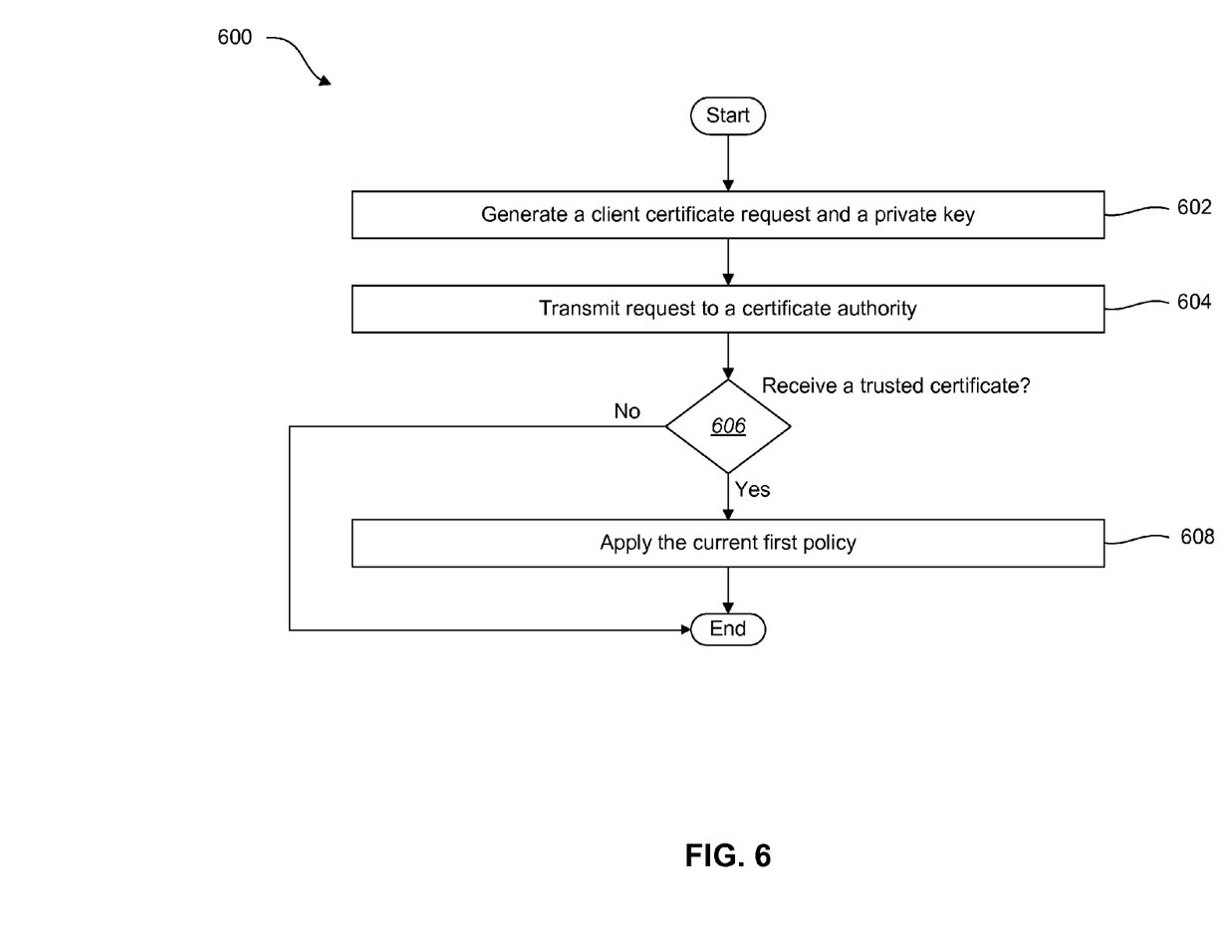
FIG. 6 is a flow diagram illustrating one embodiment of a method for obtaining a client certificate.

FIG. 6 is a flow diagram illustrating one embodiment of a method 600 for obtaining a client certificate. A client certificate request and private key may be generated 602. In one embodiment, the private key is securely stored on the node 204 and is not exported off the node 204. The certificate request may be transmitted 604 to a certificate authority along with sufficient identification information to enable the certificate authority to grant (or deny) the request. There are several identification methods that may be used when transmitting 604 a request to the certificate authority. These methods may include token based identification, username/password identification, administrator approved identification, renewal of existing client certificate, etc.

A determination 606 is made whether a trusted certificate is received from the certificate authority. If the trusted certificate is received, the current first policy is applied 608 as explained in FIG. 5. If the node 204 does not receive the trusted certificate, the current first policy is not applied. When the current first policy is applied 608, any previous policies are removed, the new algorithms are identified, exclusion lists are created and the trusted certificate and private key are made available to the protocol stack 214. Once the current first policy is applied 608, communication with other nodes may occur only if the other nodes share the same authentication policy (or they are excluded). Nodes determined to be unhealthy may have a different policy applied and so communication will be denied. Similarly, nodes that are not participating in the vulnerability scans (the scan software 208 is not installed) will have no policy (or a different policy) and so communication will be denied. The effect of applying the current first policy (a healthy IPSec policy) is to allow communications only with other nodes that are also designated as healthy or are excluded.

Figure 7:
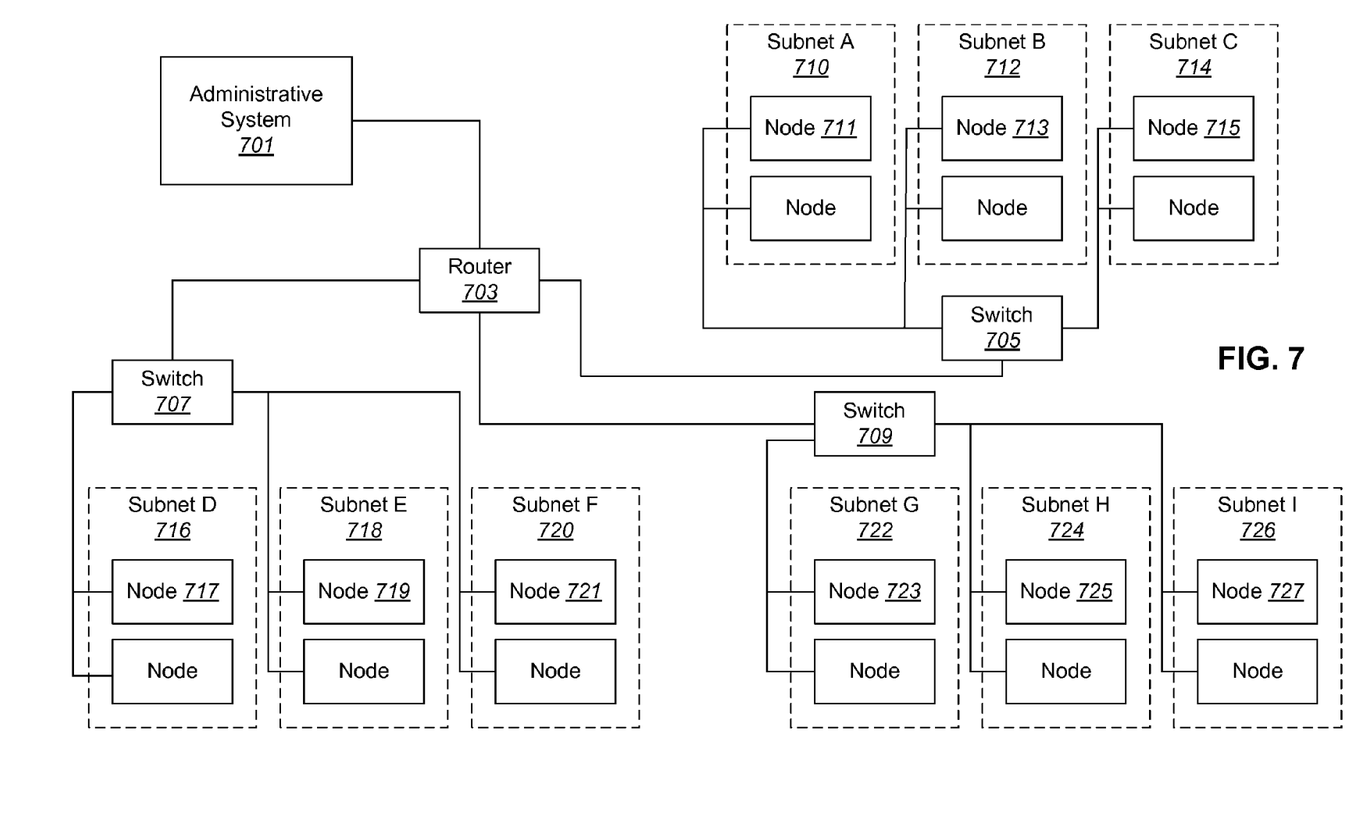
FIG. 7 is an exemplary block diagram illustrating a computer network on which the present systems and methods may be implemented.

FIG. 7 is an exemplary block diagram illustrating a computer network on which the present systems and methods may be implemented. In FIG. 7, an administrative system 701 connects to a router 703.

The router 703 may be connected to three switches: a first switch 705, a second switch 707 and a third switch 709. Each switch 705, 707, and 709 connects to three subnets. The first switch 705 connects to three subnets 710, 712, and 714. The second switch 707 connects to three subnets 716, 718, and 720. The third switch 709 connects to three subnets 722, 724, and 726. A network groups may be embodied in a wide variety of configurations and may include a local area network, a subnet 710, 712, and 714, or a group of subnets 710, 712, and 714. The network nodes or elements 711, 713, 715, 717, 719, 721, 723, 725 and 727 represent computer systems or devices on the computer network. One or more of the nodes may use embodiments of the systems and methods described herein. The network may include both wired and wireless connections to nodes or elements 711, 713, 715, 717, 719, 721, 723, 725 and 727 within the network.

Figure 8:
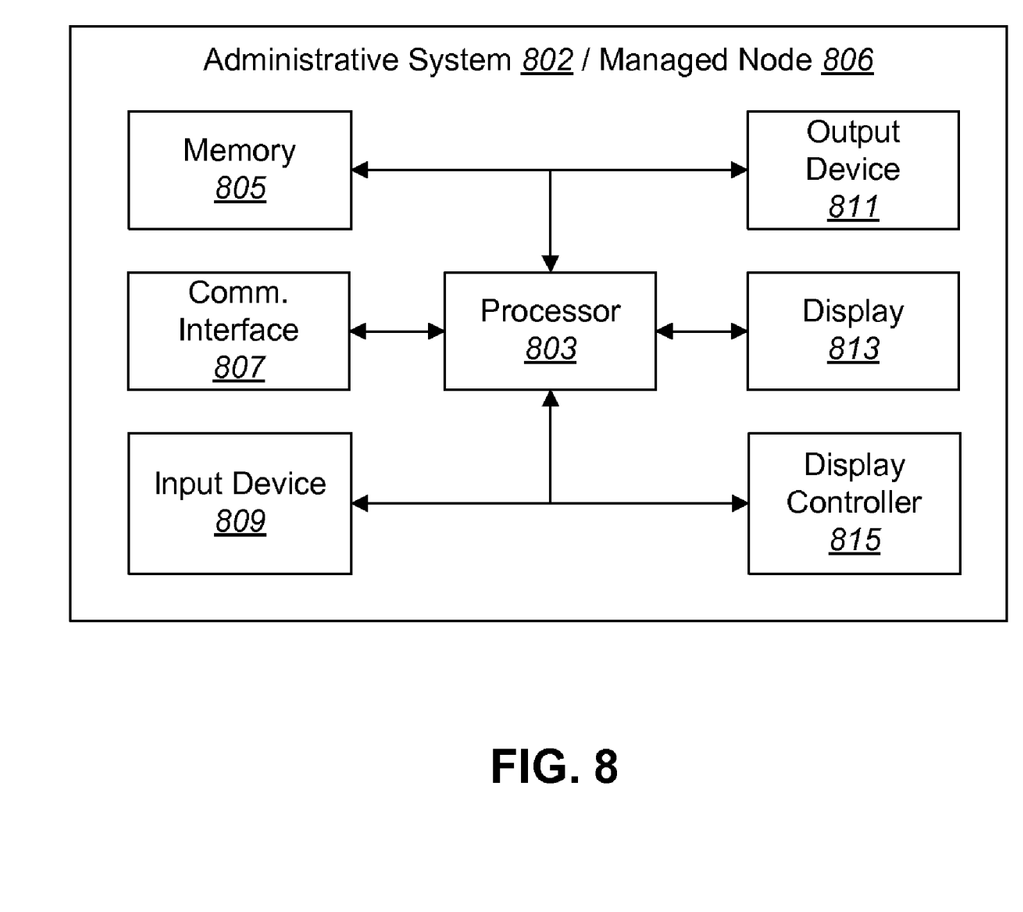
FIG. 8 is a block diagram illustrating the major hardware components typically utilized in an administrative system and/or a managed node.

FIG. 8 illustrates various components that may be utilized in an administrative system 802 and/or a managed node 806. The illustrated components may be located within the same physical structure or in separate housings or structures.

The administrative system 802 and/or managed node 806 includes a processor 803 and memory 805. The processor 803 controls the operation of the administrative system 802 and/or managed node 806 and may be embodied as a microprocessor, a microcontroller, a digital signal processor (DSP) or other device known in the art. The processor 803 typically performs logical and arithmetic operations based on program instructions stored within the memory 805.

The administrative system 802 and/or managed node 806 typically also includes one or more communication interfaces 807 for communicating with other electronic devices. The communication interfaces 807 may be based on wired communication technology, wireless communication technology, or both. Examples of different types of communication interfaces 807 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The administrative system 802 and/or managed node 806 typically also includes one or more input devices 809 and one or more output devices 811. Examples of different kinds of input devices 809 include a keyboard, mouse, microphone, remote control device, button, joystick, trackball, touchpad, lightpen, etc. Examples of different kinds of output devices 811 include a speaker, printer, etc. One specific type of output device which is typically included in a computer system is a display device 813. Display devices 813 used with embodiments disclosed herein may utilize any suitable image projection technology, such as a cathode ray tube (CRT), liquid crystal display (LCD), light-emitting diode (LED), gas plasma, electroluminescence, or the like. A display controller 815 may also be provided, for converting data stored in the memory 805 into text, graphics, and/or moving images (as appropriate) shown on the display device 813.

Of course, FIG. 8 illustrates only one possible configuration of an administrative system 802 and/or managed node 806. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for quarantining a node from other nodes in a network, the method comprising:
    scanning a node to obtain a health posture of the node by determining if the node is compliant with one or more requirements;
    obtaining a current policy in accordance with the obtained health posture of the node;
    removing a previous policy; and
    if the node is determined to be non-compliant:
        selecting a key that is unique to the non-compliant node and not selecting a unique key if the node is compliant;
        applying the current policy that applies a security protocol;
        denying communications with other nodes within a network that do not include the selected unique key; and
        allowing communications with other nodes in an exclusion list by not applying the security protocol.

2. The method of claim 1, wherein the current policy is an unhealthy Internet Protocol Security (IPSec) policy.

3. The method of claim 1, wherein the current policy comprises authentication information.

4. The method of claim 3, wherein the authentication information comprises a pre-shared key based authentication.

5. The method of claim 1, wherein the unique key is selected at random.

6. The method of claim 1, wherein the unique key is a value unique to the node.

7. The method of claim 6, wherein the unique key is the unique identification of the node.

8. The method of claim 1, further comprising removing certificates and private keys from a protocol stack within the node.

9. The method of claim 1, further comprising applying a second current policy that is different from the current policy if the node is determined to be compliant.

10. The method of claim 9, further comprising allowing communications with other nodes within a network that include the second current policy.

11. The method of claim 9, further comprising allowing communications with other nodes that are included within an exclusion list within the second current policy.

12. A computer system that is configured to be quarantined from other computer systems in a network, the computer system comprising:
- a processor;
- memory in electronic communication with the processor;
- instructions stored in the memory, the instructions being executable to:
  - scan the computer system to obtain a health posture of the computer system by determining if the computer system is compliant with one or more requirements;
  - obtain a current policy in accordance with the obtained health posture of the computer system;
  - remove a previous policy; and
  - if the computer system is determined to be non-compliant:
    - select a key that is unique to the non-compliant computer system and not selecting a unique key if the computer system is compliant;
    - apply the current policy that applies a security protocol;
    - deny communications with other nodes within a network that do not include the selected unique key; and
    - allow communications with other nodes in an exclusion list by not applying the security protocol.

13. The computer system of claim 12, wherein the current policy is an unhealthy Internet Protocol Security (IPSec) policy.

14. The computer system of claim 12, wherein the current policy comprises authentication information.

15. The computer system of claim 14, wherein the authentication information comprises a pre-shared key based authentication.

16. The computer system of claim 12, wherein the unique key is selected at random.

17. The computer system of claim 12, wherein the unique key is a value unique to the computer system.

18. A computer-readable medium comprising executable instructions for quarantining a node from other nodes in a network, the instructions being executable to:
- scan the computer system to obtain a health posture of the computer system by determining if the computer system is compliant with one or more requirements;
- obtain a current policy in accordance with the obtained health posture of the computer system;
- remove a previous policy; and
- if the computer system is determined to be non-compliant:
  - select a key that is unique to the non-compliant computer system and not selecting a unique key if the computer system is compliant;
  - apply the current policy that applies a security protocol;
  - deny communications with other nodes within a network that do not include the selected unique key; and
  - allow communications with other nodes in an exclusion list by not applying the security protocol.

* * * * *